A. L. BAUSMAN.
SHAKING TABLE.
APPLICATION FILED MAR. 8, 1919.
1,328,483.
Patented Jan. 20, 1920.
2 SHEETS—SHEET 1.
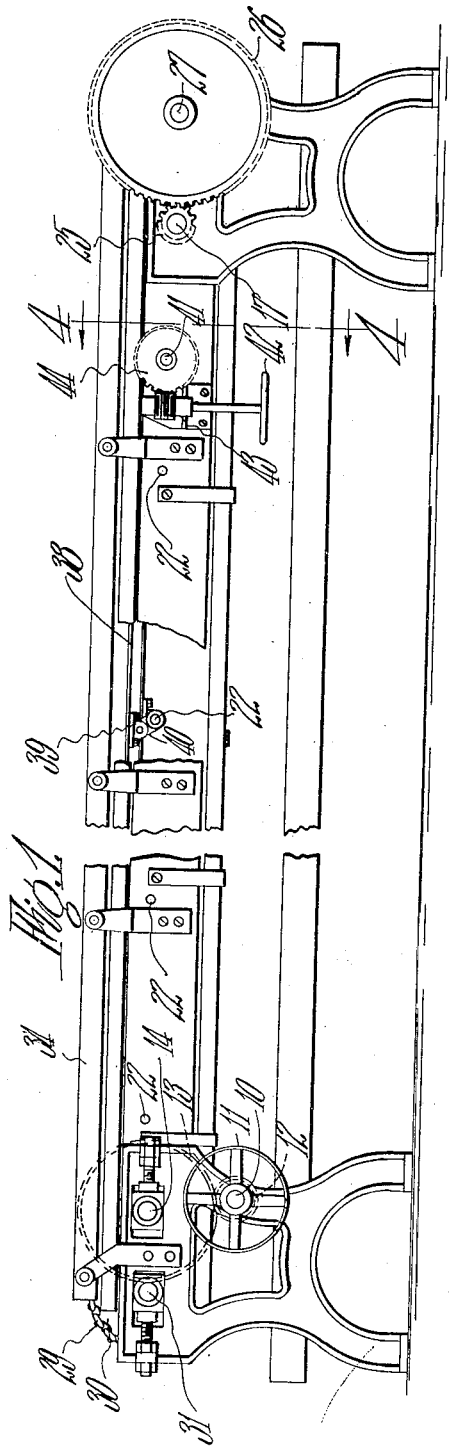
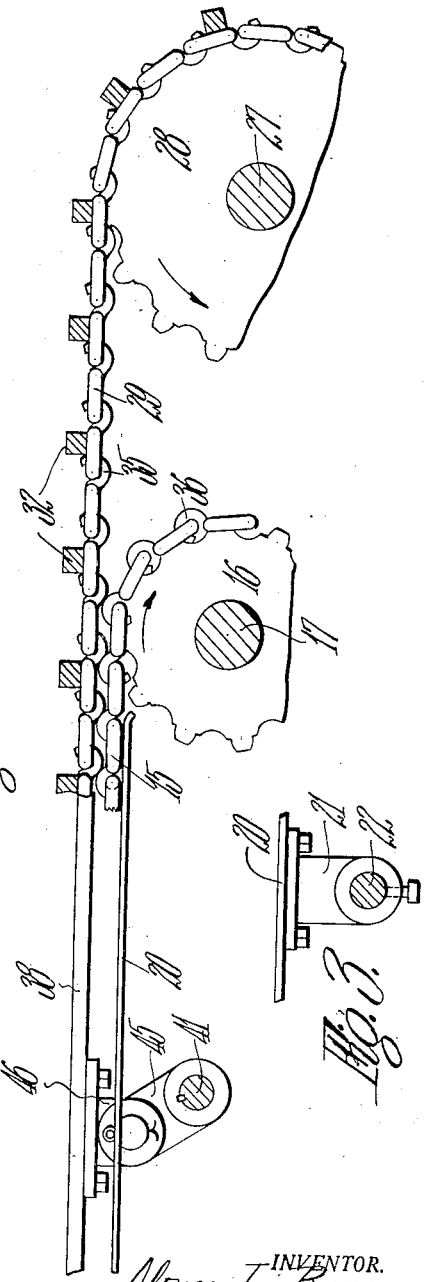
INVENTOR.
Alonzo L. Bausman.
BY Chapin & Neal
ATTORNEYS.

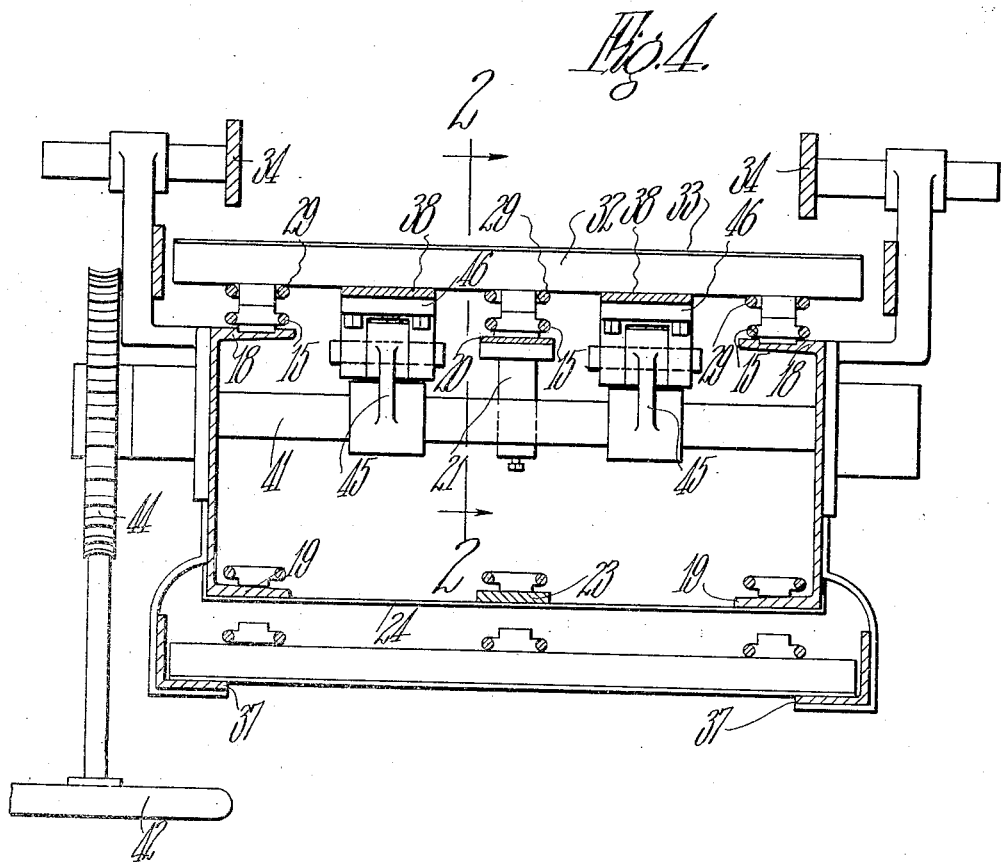

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

SHAKING-TABLE.

1,328,483. Specification of Letters Patent. Patented Jan. 20, 1920.

Application filed March 8, 1919. Serial No. 281,514.

*To all whom it may concern:*

Be it known that I, ALONZO LINTON BAUSMAN, a citizen of the United States of America, residing at Chicopee, in the county of Hampden and State of Massachusetts, have invented certain new and useful Improvements in Shaking-Tables, of which the following is a specification.

This invention relates to a shaking table on which plastic material, previously deposited in molds, is given a vibrating motion to insure the complete settling of the material therein. It relates specifically to a continuous shaking table adapted for use with confectionery molding machines to settle the contents of molds previously filled with chocolate or the like, but is obviously not limited to use in candy manufacture.

The invention is more particularly concerned with improvements in shaking tables of the type disclosed in U. S. Letters Patent No. 834,186, granted October 23, 1906 to Gabriel Carlson.

In this patent, there is described a shaking table in which the molds are carried on an endless conveyer in the form of a chain. The vibratory motion is produced by the links of that chain riding over the links of another chain driven in the opposite direction. That machine, although producing satisfactory results for a given class of work, provides for the support of the one chain on the other and so is incapable of adjustment as to the magnitude of the vibrations. Customarily, these shaking tables, which are relatively large and heavy, are permanently located in line with the confectionery molding machine to receive the molds therefrom. Frequently, the material molded is of such character that no shaking is required or desired, or only a mild shaking action is desired. With the shaking tables, such as disclosed in the Carlson patent, the shaking action is of fixed degree and cannot be varied or dispensed with as desired.

This invention has for its object the provision of means whereby the magnitude of the vibrations in a shaking table of the general type disclosed may be readily varied as desired and dispensed with altogether if necessary, depending on the particular class of work in hand.

More specifically, it is an object of the invention to provide an independent support for the mold conveying chain, which support may be moved relatively to the support for the other chain so that the degree of interengagement of the links of the two chains may be readily controlled.

Other objects and advantages will appear in the following description and in the illustrative embodiment of the invention in the accompanying drawings, in which,—

Figure 1 is a side elevation of the shaking table, with certain parts broken away;

Fig. 2 is a section on the line 2—2 of Fig. 4;

Fig. 3 is a detail of the support for the lower chain; and

Fig. 4 is a section on the line 4—4 of Fig. 1.

Mounted on one end of the main frame is a shaft 10 carrying a pulley 11 and a pinion 12, which meshes with a gear 13 on a shaft 14, preferably mounted in adjustable bearings as shown. Also carried on the shaft 14 are sprockets (not shown), over which run chains 14 (here shown as three in number), passing at the other end of the machine over sprockets 16 mounted on a shaft 17. The outer chains 15 are supported along their upper and lower reaches respectively by flanges 18 and 19, while the inner chain 15 is supported on its upper reach by a strip 20 secured to brackets 21 mounted on shafts 22 extending from side to side of the frame, and on its lower reach by a strip 23 carried on a bar 24 fastened to flanges 19.

Shaft 17 also carries a pinion 25 meshing with a gear 26 on a shaft 27, on which are mounted sprockets 28 for chains 29 which directly overlie and are adapted to contact with the chains 15 and pass around sprockets 30 at the other end of the machine. Sprockets 30 are mounted on a shaft 31 carried by adjustable bearings in the frame. Extending across chains 29 at intervals are cross bars 32 provided with a surface 33, as of leather, on which the trays or molds are carried. Side guides 34 serve to keep the trays in position on the cross bars.

Thus far the machine is very similar to that illustrated in the Carlson patent referred to. In the present invention, as well as in the machine of the patent, the vibratory or shaking movement is caused by projections 35 on chains 29 riding over similar projections 36 on chains 15. As will be seen from the arrows in Fig. 2 the chains travel in opposite direction, and as the molds pass along on cross bars 32 they are given a rapid up and down motion due to the interengagement of the two chains. In the former machine, however, there was no means of varying the magnitude of this up and down motion which was a disadvantage in adapting the shaking table for use with different products. This is accomplished in the present instance by the mechanism about to be described.

The cross bars 32 extend laterally beyond the chains and are supported along the lower reach of the chains by channels 37. Along the upper reach of the chains, bars 32 ride on tracks 38 from which depend brackets 39 (Fig. 1). These brackets are connected to shafts 22 by links 40 which turn freely about the shafts, thus forming a parallel motion linkage for tracks 38. A shaft 41 extends from side to side of the main frame and is adapted to be rotated by a hand wheel 42 through the medium of a worm 43 on the shaft of the hand wheel and a worm wheel 44 on shaft 41. Arms 45 are keyed to shaft 41 and are pivoted at their outer ends to brackets 46 depending from tracks 38. As shaft 41 is turned by the hand wheel arms 45 will be swung and tracks 38 will be raised or lowered, being kept horizontal by means of the parallel movement previously described. Since cross bars 32 are fastened to chains 29 and ride upon tracks 38 an adjustment of the latter will determine the degree of engagement between projections 35 and 36, thus determining the magnitude of the vibration or shaking imparted to the trays or molds.

It will be understood that, while I have described the preferred embodiment of my invention, the degree of separation of the chains may be varied by other means than those shown, and I deem such modifications to be within the scope of my invention.

What I claim is—

1. A shaking table, comprising, a flexible carrier having downwardly extending projections thereon, a support for the carrier provided with upwardly extending projections, means to move the carrier over its support to cause the projections thereon to ride over the projections on the support, and means for varying the engagement between the projections on the carrier and the projections on the support.

2. A shaking table, comprising, a flexible carrier, a flexible support, the latter and the carrier having oppositely extending projections, means to move the carrier and its support the one relatively to the other, the path of movement of the projections on one of said elements extending into the path of movement of the projections on the other, and means for varying the engagement between the projections.

3. A shaking table, comprising, two endless chains, one of them constituting a carrier, said chains being movable relatively to each other to cause the links of one to ride over the links of the other, a track on which one of the chains is supported, and means for adjusting the position of such track to vary the engagement between the links of the two chains.

ALONZO LINTON BAUSMAN.